United States Patent [19]

Taylor

[11] 4,325,463

[45] Apr. 20, 1982

[54] SAWHORSE

[76] Inventor: Frank E. Taylor, 1440 S. Seneca, Wichita, Kans. 67213

[21] Appl. No.: 194,586

[22] Filed: Oct. 6, 1980

[51] Int. Cl.[3] ........................ B27B 21/00; F16M 11/00

[52] U.S. Cl. .................................... 182/155; 182/181; 182/225

[58] Field of Search ............... 182/155, 153, 181, 182, 182/183, 184, 185, 186, 224, 225, 226

[56] References Cited

U.S. PATENT DOCUMENTS

| | | | |
|---|---|---|---|
| 1,881,755 | 10/1932 | Logan | 182/153 |
| 2,144,049 | 1/1939 | Forcier | 182/225 |
| 2,396,737 | 3/1946 | Maclaskey | 182/155 |
| 2,721,060 | 10/1955 | Morain | 182/186 |
| 3,212,606 | 10/1965 | Spaw | 182/226 |
| 3,233,701 | 2/1966 | Hentzi | 182/155 |
| 3,282,379 | 11/1966 | Jones | 182/186 |
| 3,443,662 | 5/1969 | Thompson | 182/155 |
| 3,978,943 | 9/1976 | Greenman | 182/155 |

FOREIGN PATENT DOCUMENTS

| | | | |
|---|---|---|---|
| 647823 | 9/1962 | Canada | 182/155 |

*Primary Examiner*—Reinaldo P. Machado
*Attorney, Agent, or Firm*—John H. Widdowson

[57] ABSTRACT

A sawhorse having an elongated support member; a pair of elongated support rest bracket members; at least one pair of facing channel members bound to each of the support rest bracket members; a mounting bolt secured within and between the mounting bolt aperture of each facing channel member; a pair of sawhorse leg bracket members pivotally slidably disposed to each mounting bolt and each securing an end of a sawhorse leg; and a helical spring mounted around each of the mounting bolts and between each of the pair of leg bracket members. A process for collapsing a sawhorse for storing and/or transporting the same comprising compressing the helical spring on each mounting bolt by inwardly pivoting each pair of sawhorse legs; clearing the sawhorse leg bracket members out of the channels of the channel members; aligning the legs in a general relationship; and rotating each pair of legs towards the underside of the elongated support member.

7 Claims, 9 Drawing Figures

SAWHORSE

BACKGROUND OF THE INVENTION

1. Field of the Invention

This invention is related to a sawhorse. More specifically, this invention provides a collapsible sawhorse and a process for storing and/or transporting a sawhorse.

2. Description of the Prior Art

U.S. Pat. No. 1,881,755 by Logan et al discloses a sawhorse wherein a bracket assembly has means to fasten thereto support legs which are used to support a horizontal stringer. U.S. Pat. No. 3,443,662 by Thompson discloses a bracket assembly for constructing a sawhorse which is much the same as Logan et al. Other patents of interest are the following: U.S. Pat. No. 3,282,379 by Jones; U.S. Pat. No. 3,978,943 by Greenman et al; U.S. Pat. No. 2,144,049 by Forcier; U.S. Pat. No. 2,721,060 by Morain; and U.S. Pat. No. 3,212,606 by Spaw. None of the foregoing prior art teach or suggest the particular sawhorse and process of this invention.

SUMMARY OF THE INVENTION

This invention accomplishes its desired objects by providing a sawhorse having an elongated support member; a pair of elongated support rest bracket members, each secured in proximity to an end of the elongated support member; and at least one pair of facing channel members bound to each of the support rest bracket members, each facing channel member having a channel and a structure defining a mounting bolt aperture. A mounting bolt is secured within and between the mounting bolt aperture of each facing channel member. A pair of sawhorse leg bracket members is pivotally slidably disposed to each of the mounting bolts and each is secured to an end of the sawhorse. A spring biasing means is mounted around each of the mounting bolts and between each of the pair of leg bracket members and in the extended supporting/operating position biasing and holding the leg bracket members within the channel of the channel members. The invention also accomplishes its desired objects by providing a process for collapsing a sawhorse for storing and/or transporting the sawhorse comprising the steps of: compressing the spring biasing means on each mounting bolt by inwardly pivoting each pair of sawhorse legs including the attached sawhorse bracket members; clearing the sawhorse leg bracket members out of the channels of the channel members; aligning the legs in a general planar relationship; and rotating each pair of legs on each end of the elongated support member towards the underside of the elongated support member for folding and lodging the legs thereunder.

It is an object of the invention to provide a novel sawhorse and a novel process for collapsing a sawhorse for storing and/or transporting the sawhorse.

Still further objects of the invention reside in the provision of a sawhorse which can be easily transported and is relatively inexpensive to manufacture.

These together with the various ancillary objects and features will become apparent as the following description proceeds, are attained by the sawhorse, preferred embodiment being shown in the accompanying drawings, by way of example only, wherein:

DETAILED DESRIPTION OF THE INVENTION

Figure 1:
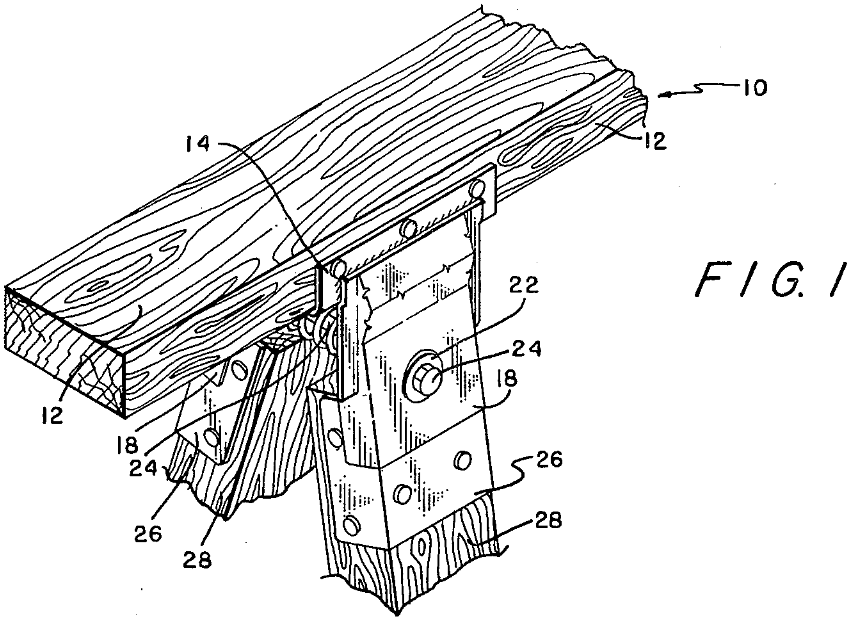
FIG. 1 is an enlarged perspective view of an end of a sawhorse disclosing the collapsible leg assembly.
Figure 2:
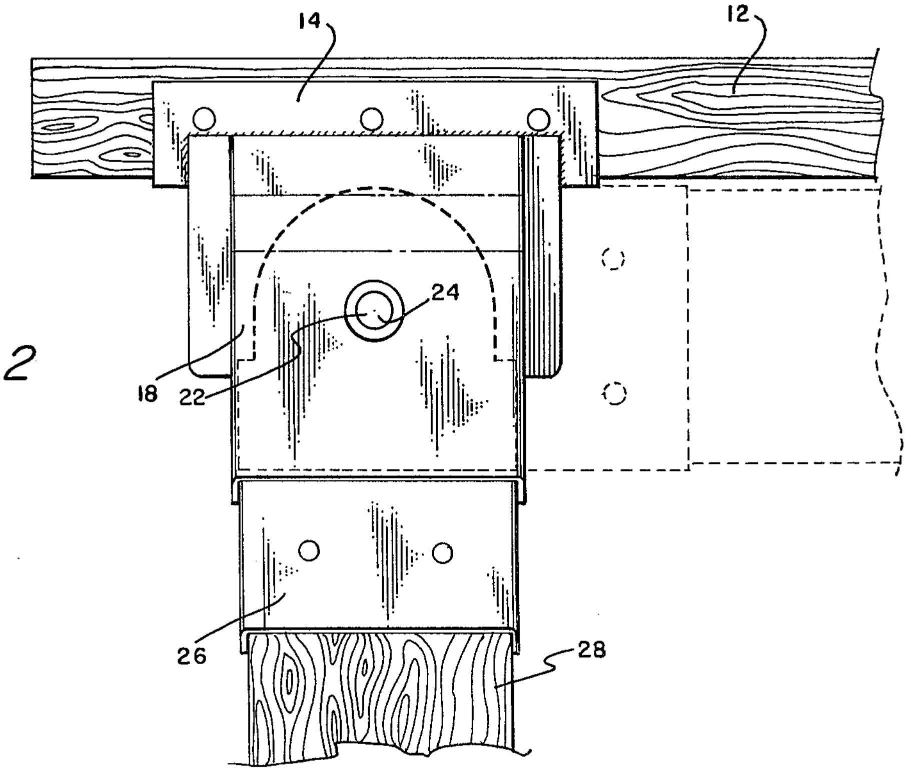
FIG. 2 is a partial side elevational view of the collapsible sawhorse leg assembly with dotted lines representing the folded position of the legs.
Figure 3:
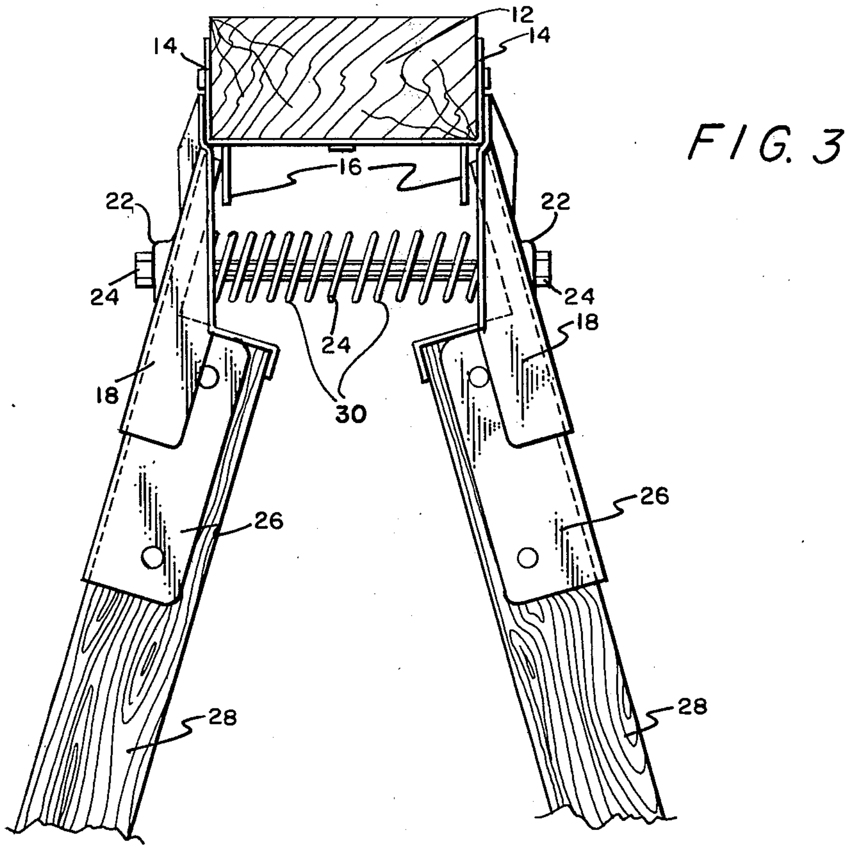
FIG. 3 is a partial front elevational view of the collapsible sawhorse leg assembly.
Figure 4:
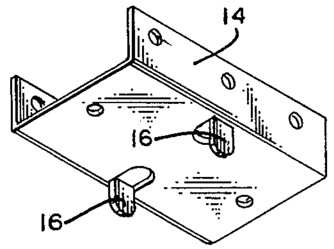
FIG. 4 is a perspective view of the elongated support rest member.
Figure 5:
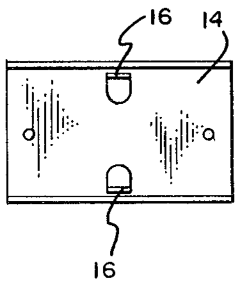
FIG. 5 is a top plan view of the support rest member.

Referring in detail now to the drawings, wherein like reference numerals designate similar parts throughout the various views, there is seen a sawhorse, or the like, generally illustrated as 10, having an elongated support member 12; and a pair of elongated U-shaped (in vertical cross section) support rest bracket members 14—14, each secured in proximity to an end of the elongated support member 12. Elongated support rest bracket members 14—14 include leg bracket stop members 16—16. At least one pair of facing channel members 18—18 is bound to each of the support rest bracket members 14—14. Each facing channel member 18 has a channel 20 and mounting bolt aperture 22. A mounting bolt 24 is secured within and between the mounting bolt aperture 20 of each facing channel member 18. A pair of sawhorse, or the like, leg bracket members 26—26 is pivotally, slidably disposed to each of the mounting bolts, and each is secured to an end of a sawhorse or the like, leg 28. A spring biasing means 30 (eg. a helical spring or the like) is mounted around each of the mounting bolts 24 and between each of the pair of leg bracket members 26—26 and when the sawhorse 10 is in the extended supporting/operating position, the biasing means 30 biases and holds the leg bracket member 26 within the channel 20 of the channel member 18.

Figure 7:
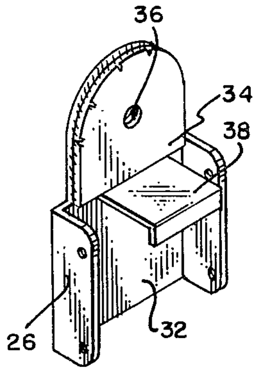
FIG. 7 is a perspective view of a leg bracket member.

Each of the pair of facing channel members 18—18 is bound to, and obliquely angularly disposed with respect to, a side of the U-shaped elongated support rest bracket member 14. Each of the leg bracket members 26—26 (see FIG. 7) comprises a generally U-shaped body 32, and a semi-circular head plate structure 34 having a leg bracket aperture 36 wherethrough the mounting bolt 24 passes to provide for the pivotation and slidability of the leg bracket member 26 about the mounting bolt 24. Leg bracket members 26 also include a generally L-shaped lip 38 bound between the head 34 and the body 32. The L-shaped lip 38 overlaps the face of the end of the leg 28 while the sides of the U-shaped body 32 connect to opposed sides of the leg 28.

The sawhorse 10 in operation of the invention being adopted for storage and/or transportation by compressing the spring biasing means 30 (i.e. helical spring) on each mounting bolt 24 by inwardly pivoting (see FIG.

Figure 8:
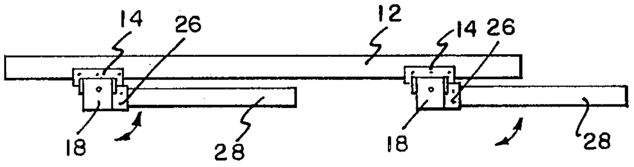
FIG. 8 is a top plan view of a sawhorse wherein both pair of legs have been rotated counterclockwise.
Figure 9:
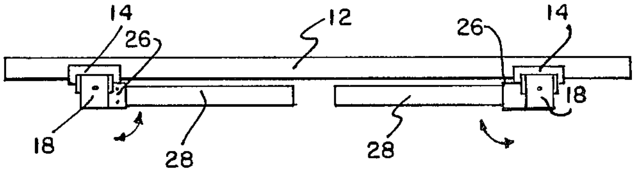
FIG. 9 is a top plan view of a sawhorse wherein one pair of legs has been rotated counterclockwise and another pair of legs has been rotated clockwise, for storage and/or transportation of the sawhorse.

6) each pair of sawhorse legs 28 including the attached sawhorse leg bracket members 26 until clearing the channels 20 of the channel members 18 and aligning the legs 28 in a general planar relationship. Subsequently each pair of legs 28—28 on each end of the elongated support member 12 is rotated (both pair counterclockwise in FIG. 8, one pair counterclockwise and another pair clockwise in FIG. 9) towards the underside of the elongated support member 12 for folding and lodging the legs 28 thereunder. The pair of protruding leg bracket stop members 16—16 of the support rest bracket members 14 stop the inwardly pivotation of each pair of legs 28—28 including the attached leg bracket members 26—26 and assist in aligning the legs 28—28 in a general planar relationship.

Figure 6:
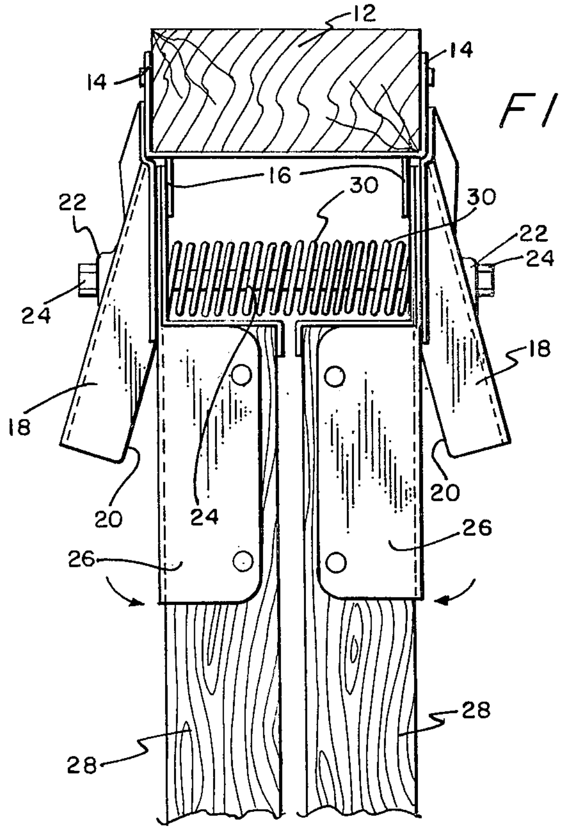
FIG. 6 is a partial front elevational view of the collapsible sawhorse leg assembly with the sawhorse legs inwardly pivoted and in general alignment in a planar relationship.

With continuing reference to the drawings for the process for collapsing the sawhorse 10 for storing and/or transporting the sawhorse 10, including compressing the spring biasing means 30 on each mounting bolt 24 by inwardly pivoting, in accordance with FIG. 6, each pair of sawhorse legs 28—28 having attached thereto the leg bracket members 18. Sawhorse legs 28—28 are inwardly pivoted until the leg bracket members 26 clear the channels 20 of the channel members 18 and the stop members 16 of support rest bracket members 14 engage/stop the leg bracket members 26. The legs 28 are then aligned in a general planar relationship as seen in FIG. 6. Subsequently, in accordance with FIGS. 8 and 9, depending on the length of elongated support member 12 and the length of legs 28, each pair of legs 28—28 on the end of support member 12 is rotated towards the underside of the support member 12 for folding and lodging the leg 28 thereunder.

While the present invention has been described herein with reference to particular embodiments thereof, a latitude of modifications, various changes and substitutions are intended in the foregoing disclosure, and it will be appreciated that in some instances some features of the invention will be employed without a corresponding use of other features without departing from the scope of the invention as set forth.

I claim:

1. A sawhorse or the like comprising:

(a) an elongated support member;

(b) a pair of elongated support rest bracket members, each secured in proximity to an end of said elongated support member;

(c) at least one pair of facing channel members bound to each of said support rest bracket members, each facing channel member having a channel and a structure defining a mounting bolt aperture;

(d) a mounting bolt secured within and between said mounting bolt aperture of each facing channel member;

(e) a pair of sawhorse, or the like, leg bracket members pivotally, slidably disposed to each of said mounting bolts and each securing an end of a sawhorse, or the like, leg;

(f) spring biasing means operatively mounted relative said mounting bolts and between each of said pair of leg bracket members and in the extended supporting/operating position biasing and holding said leg bracket members within the channel of the channel members;

(g) said sawhorse, or the like, being adapted for storage and/or transportation by actuating said spring biasing means by inwardly pivoting each pair of sawhorse, or the like, legs including the attached sawhorse, or the like, leg bracket members until clearing the channels of the channel members and generally aligning the legs in a general planar relationship, and subsequently rotating each pair of legs on each end of said elongated support member towards the underside of elongated support member for folding and lodging said legs thereunder.

2. The sawhorse of claim 1 wherein said spring biasing means is helical springs mounted around each of said bolts, and said elongated support rest bracket members comprises a pair of protruding leg bracket stop members for stopping the inwardly pivotation of each pair of legs including the attached leg bracket members and aligning the legs in a general planar relationship.

3. The sawhorse of claim 2 wherein said elongated support rest bracket members are generally U-shaped in vertical cross section.

4. The sawhorse of claim 3 wherein each of said pair of facing channel members is bound to and obliquely angularly disposed with respect to a side of said U-shaped elongated support rest bracket member.

5. The sawhorse of claim 4 wherein each of said leg bracket members comprises a generally U-shaped body, a head bound to the U-shaped body and defined by an essentially semi-circular plate structure, and a generally L-shaped lip bound between said head and said body, said L-shaped lip overlapping the face of the end of said leg while the sides of said U-shaped body connecting to opposed sides of said leg, said semi-circular head having a structure defining a leg bracket aperture wherethrough said mounting bolt passes to provide for the pivotation and slidability of said leg bracket member about said mounting bolt.

6. A process for collapsing a sawhorse, or the like, for storing and/or transporting the sawhorse, or the like, having an elongated support member; a pair of elongated support rest bracket members, each secured in proximity to an end of said elongated support member; at least one pair of facing channel members bound to each of the support rest bracket members and having a channel and a mounting bolt aperture; a mounting bolt secured within and between the mounting bolt aperture of each facing channel member; a pair of sawhorse leg bracket members pivotally disposed to each of the mounting bolts and each securing an end of a sawhorse leg; a spring biasing means mounted around each of the mounting bolts and between each of the pair of leg bracket members and in the extended supporting/operating position biasing and holding the leg bracket members within the channel of the channel members, said process comprising the steps of:

(a) compressing said spring biasing means on each mounting bolt by inwardly pivoting each pair of sawhorse legs including the attached sawhorse leg bracket members;

(b) clearing the sawhorse leg bracket members out of the channels of the channel members;

(c) aligning the legs in a general planar relationship; and (d) rotating each pair of legs on each end of the elongated support member towards the underside of the elongated support member for folding and lodging the legs thereunder.

7. The process of claim 6 additionally including stopping the sawhorse leg bracket members subsequent to said clearing step (b).

* * * * *